United States Patent
Thaler (12) 
(10) Patent No.: US 6,168,208 B1
(45) Date of Patent: Jan. 2, 2001

(54) SEAL FOR USE WITH ROOF DRAINS

(76) Inventor: Ken Thaler, 32-33 Maplewood Dr, R. R. #1, Parry Sound, Ontario (CA), P2A2W7

(*) Notice: Under 35 U.S.C. 154(b), the term of this patent shall be extended for 0 days.

(21) Appl. No.: 09/085,816

(22) Filed: May 27, 1998

(51) Int. Cl.$^7$ .................................................. E04O 13/04
(52) U.S. Cl. ........................... 285/42; 277/607; 285/110; 285/231; 285/347
(58) Field of Search .................................. 52/220.8, 219, 52/198, 302.1; 285/42, 110, 111, 347; 277/602, 607, 626, 627

(56) References Cited

U.S. PATENT DOCUMENTS

| | | |
|---|---|---|
| 1,282,535 | 10/1918 | Bropson . |
| 2,284,416 | 5/1942 | Gordon . |
| 2,561,884 * | 7/1951 | Perrow .................................. 285/110 |
| 3,510,140 * | 5/1970 | Hermann ............................... 277/607 |
| 3,909,412 | 9/1975 | Patry . |
| 4,505,814 | 3/1985 | Marshall . |

FOREIGN PATENT DOCUMENTS

| | | |
|---|---|---|
| 2128446 | 6/1997 | (CA) . |

* cited by examiner

Primary Examiner—Michael Safavi
(74) Attorney, Agent, or Firm—Mark Kusner (57) ABSTRACT

A sealing grommet is for use in coupling in sealed relation a drain pipe depending from a roof and a co-operating leader pipe. The bottom end of the drain pipe is inserted into the top end of the co-operating leader pipe. The outside diameter of the drain pipe is smaller than the inside diameter of the co-operating leader pipe by an unspecified distance. The sealing grommet comprises an annular base portion having top, bottom, radially inner side and radially outer side surfaces. An annular interior wall portion extends upwardly from the base portion to terminate at a top edge, and is defined by opposed inner and outer wall surfaces. The interior wall portion has an overall inside diameter defined by the inner wall surface. A substantially resilient annular exterior wall portion extends upwardly and outwardly from the base portion in spaced apart relation to the annular interior wall portion, to terminate at a top edge, and is defined by opposed inner and outer wall surfaces. The exterior wall portion has an overall outside diameter defined by the outer wall surface. The bottom end of the drain pipe is retained within the substantially resilient annular interior wall portion in sealed engagement with the inner wall surface. The top end of the co-operating leader pipe surrounds the substantially resilient annular exterior wall portion in sealed engagement with the outer wall surface, thereby coupling in sealed relation the drain pipe and the co-operating leader pipe.

19 Claims, 7 Drawing Sheets

SEAL FOR USE WITH ROOF DRAINS

FIELD OF THE INVENTION

The present invention relates to sealing grommets for use in coupling in sealed relation a roof drain pipe and a co-operating leader pipe, and more particularly relates to such sealing grommets where the outside diameter of said drain pipe is smaller than the inside diameter of said co-operating leader pipe by an unspecified distance.

BACKGROUND OF THE INVENTION

In buildings having a flat roof, it is necessary to use one or more roof drains to permit water to drain from the roof. Typically, a conventional roof drain comprises an upper gravel stop portion which empties at its lower extent into a funnel shaped mouth portion. A removable metal or PVC strainer sits atop the mouth portion, and is concentrically surrounded by the gravel stop portion. A drain pipe is concentrically attached to the base of the mouth portion, so as to depend from the interior surface of the roof when the roof drain is installed. The bottom end of the drain pipe is inserted into the top end of a substantially vertically disposed leader pipe, so as to be connected in fluid communication therewith. The leader pipe is, in turn, operatively connected at its opposite other end to the building's storm sewer system so as to lead the water received by the roof drain away from the building in a controlled manner.

In order to preclude possible backflow of water upwardly from the leader pipe and out of the radially disposed gap between the leader pipe and the drain pipe, it is standard practice to use an annular grommet, which grommet is essentially an "O"-ring, disposed between the outside annular surface of the bottom end portion of the drain pipe and the inside annular surface of the top end portion of the co-operating leader pipe.

There are significant problems associated with such conventional prior art grommets, and accordingly with the connection of drain pipes to leader pipes using such conventional prior art grommets. While conventional prior art grommets do provide a seal between the drain pipe and the co-operating leader pipe under ideal conditions which offer close tolerances, they are know to be prone to leaking, especially if the drain pipe and the co-operating leader pipe have irregularities in their outer and inner surfaces, respectively, or are axially offset one with the other, or where significant mis-alignment of the drain pipe with the leader pipe occurs over time due to shifting of the roof deck relative to the leader pipe, or on account of differential expansion or contraction between the drain pipe and the leader pipe.

Also, it is common practice to use one standard conventional drain pipe on most, or all, roof drains, which drain pipe has a standard outside diameter. However, two sizes of leader pipes are conventionally used with this standard outside diameter drain pipe. While both sizes of conventional leader pipes are of a common outside diameter, one size, commonly known as "Schedule 80" pipe, has thicker walls, and therefor has a smaller inside diameter than does the other size, commonly known as "Schedule 40" pipe. Accordingly, two different sizes of conventional "O"-ring type grommets must be used, depending on which size of leader pipe is used. It is highly undesirable to have to use two sizes of conventional "O"-ring type grommets since two sets of grommets must be kept in inventory. Moreover, it is inconvenient to have both sizes of conventional "O"-ring type grommets available on hand at each job site, and it frequently occurs that the necessary size is not available. Given the timing pressures extant on modern construction sites, it has, on occasion, been the case that the wrong size "O"-ring has been used in particular installations, with the resultant loss of sealing integrity in these installations.

It is therefore an object of the present invention to provide a sealing grommet for use in coupling together in sealed relation a drain pipe and a co-operating leader pipe, which sealing grommet effects a substantially leak-proof seal between the drain pipe and the co-operating leader pipe, even where the diameter of the pipes may vary somewhat in the area of sealing, due to surface irregularities or other deformities in the respective pipes.

It is another object of the present invention to provide a sealing grommet for use in coupling together in sealed relation a drain pipe and a co-operating leader pipe, which sealing grommet effects a substantially leak-proof seal between the drain pipe and an axially offset co-operating leader pipe.

It is a further object of the present invention to provide a single sealing grommet for use in coupling together in sealed relation a drain pipe of a known outside diameter and a co-operating leader pipe having a range of possible inside diameters.

It is yet another object of the present invention to provide a single sealing grommet for use in coupling in sealed relation a drain pipe and a co-operating leader pipe, wherein the outside diameter of said drain pipe is smaller than the inside diameter of said co-operating leader pipe by an unspecified distance.

It is yet a further object of the present invention to provide a single size sealing grommet for use in coupling in sealed relation a drain pipe and a co-operating leader pipe, and thereby preclude the necessity to store in inventory and make available at job sites more than one size of sealing grommet.

SUMMARY OF THE INVENTION

In accordance with one aspect of the present invention there is disclosed a sealing grommet for use in coupling in sealed relation a drain pipe depending from a roof and a co-operating leader pipe. The bottom end portion of the drain pipe is inserted into the top end portion of the co-operating leader pipe. The outside diameter of the drain pipe is smaller than the inside diameter of the co-operating leader pipe by an unspecified distance. The sealing grommet comprises an annular base portion having top, bottom, radially inner side and radially outer side surfaces. An annular interior wall portion extends upwardly from the base portion to terminate at a top edge, and is defined by opposed inner and outer wall surfaces. The interior wall portion has an overall inside diameter defined by the inner wall surface. A substantially resilient annular exterior wall portion extends upwardly and outwardly from the base portion in spaced apart relation to the annular interior wall portion, to terminate at a top edge, and is defined by opposed inner and outer wall surfaces. The exterior wall portion has an overall outside diameter defined by the outer wall surface. The bottom end portion of the drain pipe is retained within the substantially resilient annular interior wall portion in sealed engagement with the inner wall surface. The top end portion of the co-operating leader pipe surrounds the substantially resilient annular exterior wall portion in sealed engagement with the outer wall surface, thereby coupling in sealed relation the drain pipe and the co-operating leader pipe. The sealing grommet is preferably injection molded as a monolithic structure from a vulcanized synthetic rubber material, most preferably ethylene propylene diene monomer (EPDM).

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the sealing grommet for use in coupling in sealed relation a roof drain pipe and a co-operating leader pipe, according to the present invention, as to its structure, organization, use and method of installation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
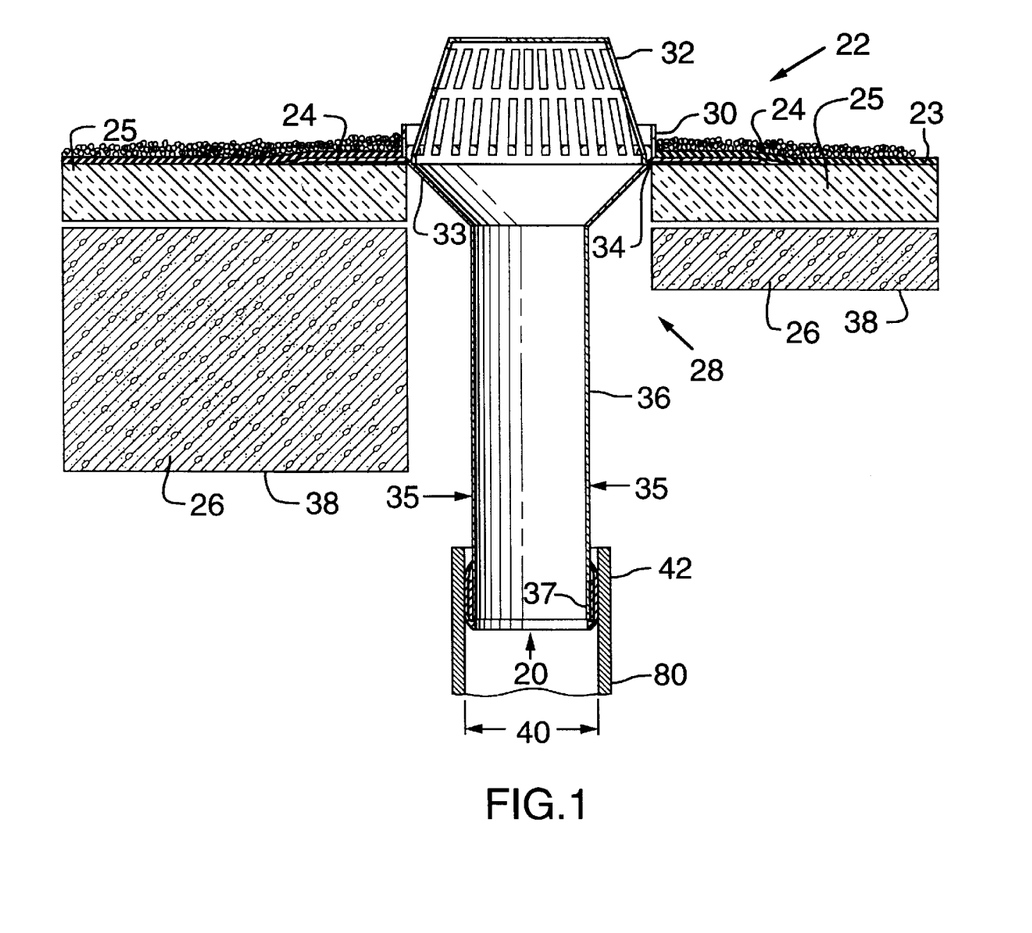
FIG. 1 is a sectional side elevational view of a building roof having a roof drain installed thereon, with a preferred embodiment of sealing grommet according to the present invention installed between the drain pipe of the roof drain and a co-operating leader pipe.
Figure 2:
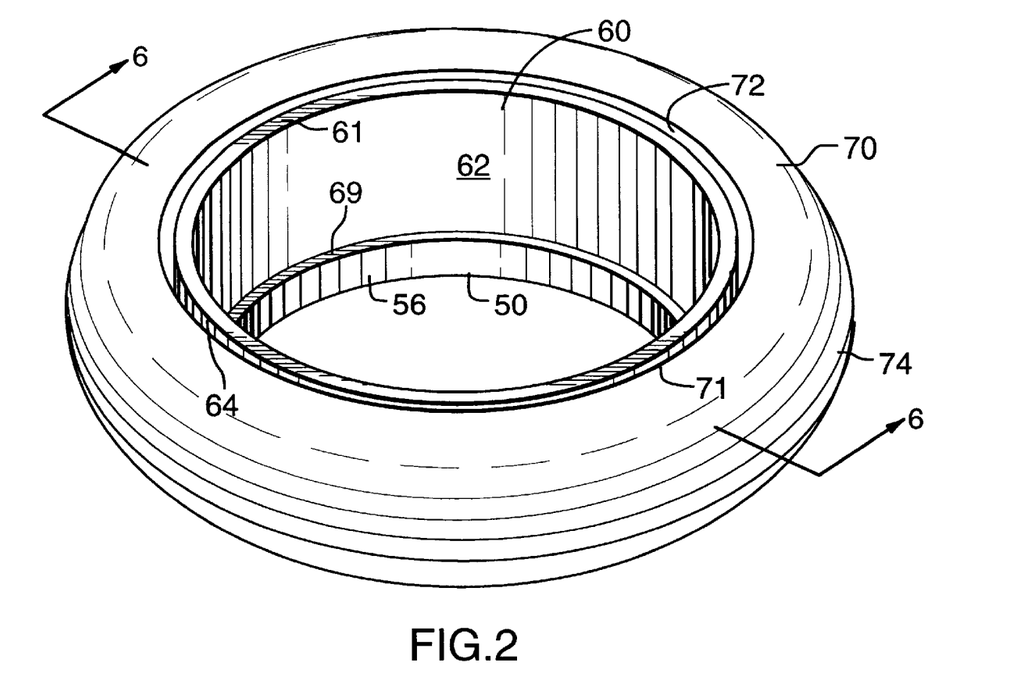
FIG. 2 is an enlarged scale perspective view from the top of the preferred embodiment of sealing grommet shown in FIG. 1.

Referring now to FIGS. 1 through 10 of the drawings, there is shown a preferred embodiment of the sealing grommet of the present invention, as indicated by the general reference numeral 20. Referring first to FIG. 1, a conventional flat roof, as indicated by the general reference numeral 22, of a building (not shown), and comprises a roof deck 25 overlying a concrete supporting form 26. A conventional roof drain, as indicated by the general reference numeral 28, is installed onto the flat roof 22 and comprises a stainless steel gravel stop portion 30 and a funnel shaped mouth portion 33. A removable PVC strainer 32 sits atop the mouth portion 33, and is concentrically surrounded by the gravel stop portion 30. A drain pipe 36 is concentrically mounted at the base of the mouth portion 33, so as to depend from the interior surface 38 of the roof 22, thereby to permit water to drain from the roof 22 into a co-operating leader pipe 80. The roof drain 28 is mounted to the top surface 23 of the roof 22 by means of conventional fasteners (not shown) passing through a radially projecting deck flange 34 portion of the roof drain 28, with the gravel stop 30 and the PVC strainer both projecting upwardly from the top surface 23 of the roof 22. Conventional roofing materials 24 (such as asphalt and gravel) cover the deck flange 34 in the final installation. The bottom end portion 37 of the drain pipe is inserted into the top end portion 82 of the co-operating leader pipe 80, as can be best seen in FIGS. 1, and 8 through 10. The sealing grommet 20 of the present invention is for use in coupling the drain pipe 36 and the co-operating leader pipe 80 in sealed relation, and is shown in FIGS. 1, and 8 through 10 installed in place between the drain pipe 36 and the co-operating leader pipe 80.

Figure 9:
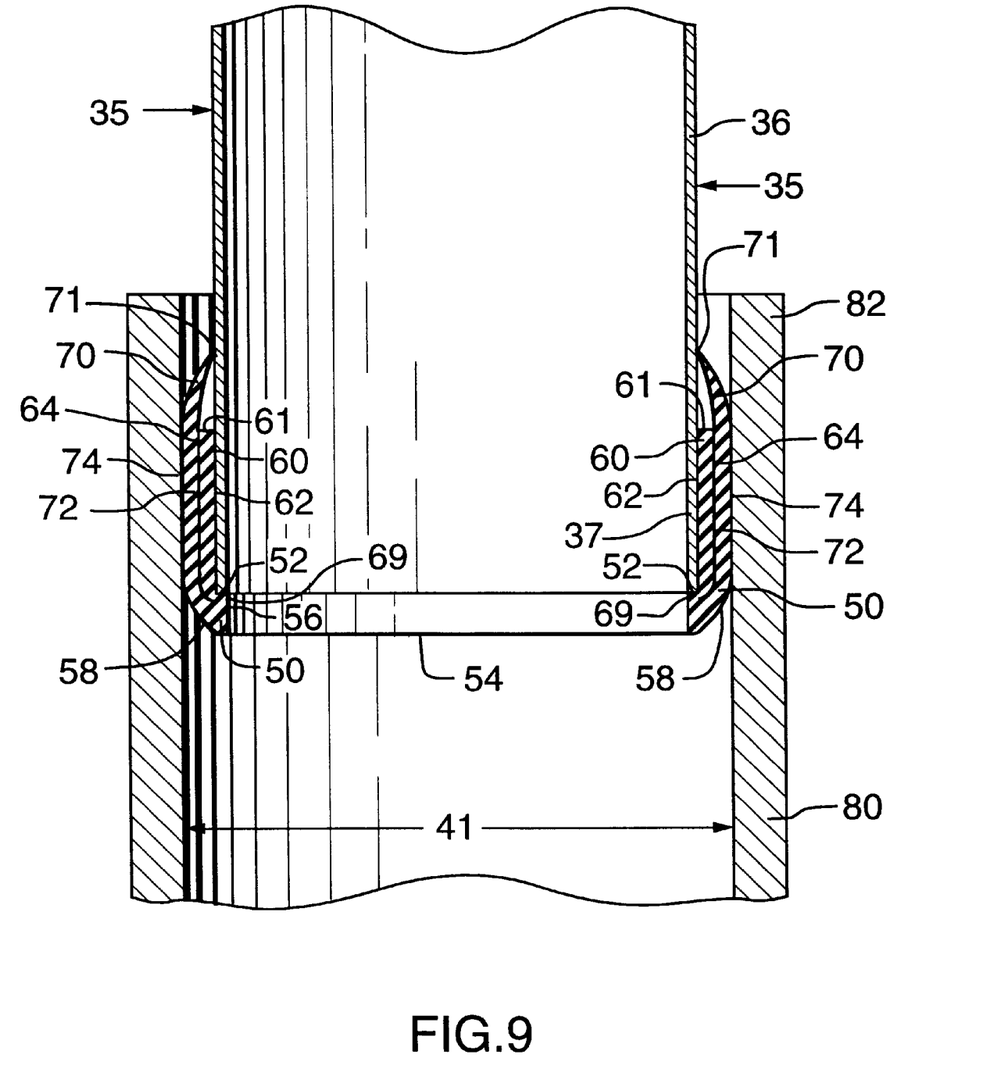
FIG. 9 is a sectional side elevational view similar to FIG. 8, with the preferred embodiment sealing grommet and bottom end portion of a drain pipe fully inserted into the top end portion of the co-operating leader pipe; and, FIG. 10 is a sectional side elevational view similar to FIG. 9, but with the co-operating leader pipe having a wider inside diameter than the leader pipe of FIG. 9.
Figure 10:
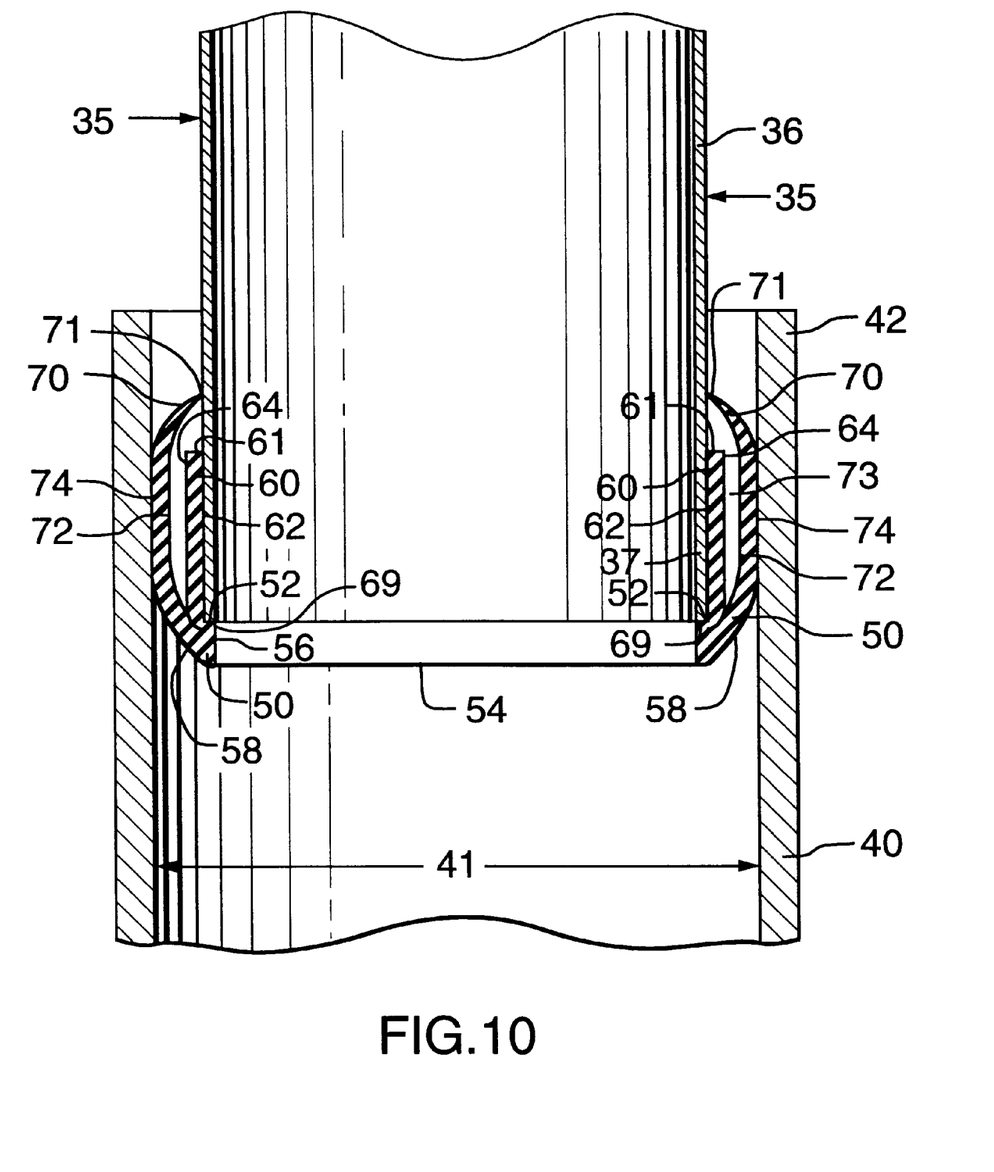

As can best be seen in FIGS. 9 and 10, the outside diameter 35—35 of the drain pipe 36 is smaller than the inside diameter 41 of the co-operating leader pipe by an unspecified distance, depending on the inside diameter 41 of the particular leader pipe. The leader pipe 80 shown in FIG. 9, commonly known as "Schedule 80" type leader pipe, has thicker walls than the leader pipe 40 shown in FIG. 10, commonly known as "Schedule 40" type leader pipe. Accordingly, the inside diameter 41 of the "Schedule 80" leader pipe 80 illustrated in FIG. 9 is smaller than the inside diameter 41 of the "Schedule 40" leader pipe 40 illustrated in FIG. 10.

Referring now to FIGS. 2 through 7 of the drawings, the sealing grommet 20 is shown separately, not installed in place between a drain pipe and a leader pipe. In the preferred embodiment illustrated herein, the sealing grommet 20 is of a monolithic construction for purposes of strength, simplicity, and ease of manufacture. For the purposes of durability, resiliency, and low cost, the sealing grommet 20 is preferably injection molded from a thermoplastic elastomeric material, such as a suitable vulcanized synthetic rubber, and most preferably from EPDM rubber.

The sealing grommet 20 comprises an annular base portion 50 having a top surface 52, a bottom surface 54, a radially inner side surface 56 and a radially outer side surface 58.

An annular interior wall portion 60 extends upwardly from the top surface 52 of the annular base portion 50 to terminate at a top edge 61. The annular interior wall portion 60 is defined by opposed inner 62 and outer 64 wall surfaces and, in the preferred embodiment illustrated, has a substantially constant thickness "$T_i$", as can be best seen in FIG. 7. However, the thickness of the annular interior wall portion 60 may vary from top to bottom or around its circumference, to facilitate placement onto the drain pipe 36 or to promote proper sealing engagement with the drain pipe 36. Also, in order to achieve maximum strength, the annular interior wall portion 60 is continuous and unbroken, but may have perforations or the like therein (not shown), if desired.

Figure 3:
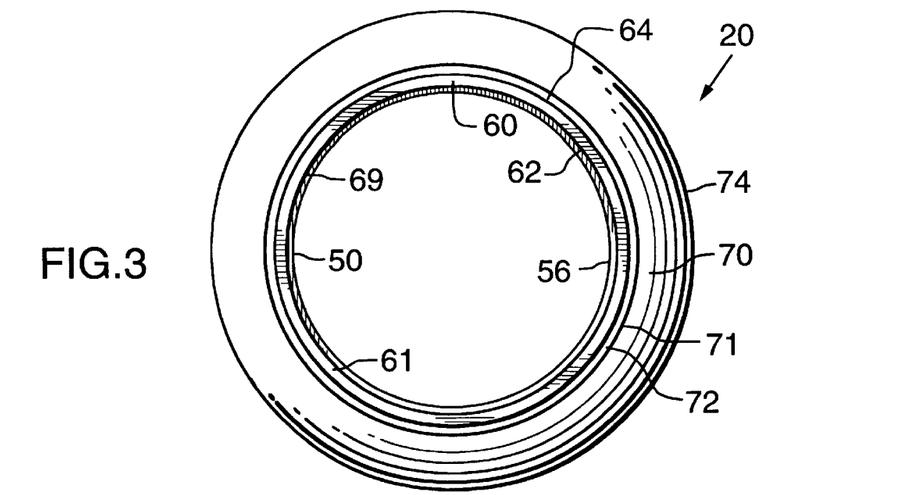
FIG. 3 is a top plan view of the preferred embodiment of sealing grommet shown in FIG. 2.
Figure 4:
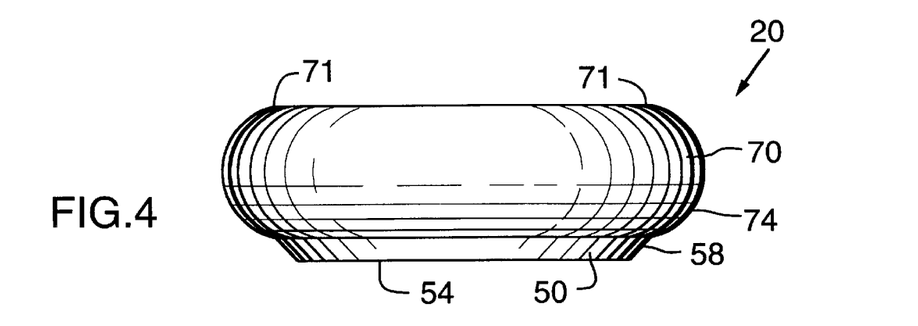
FIG. 4 is a side elevational view of the preferred embodiment sealing grommet shown in FIG. 2.
Figure 5:
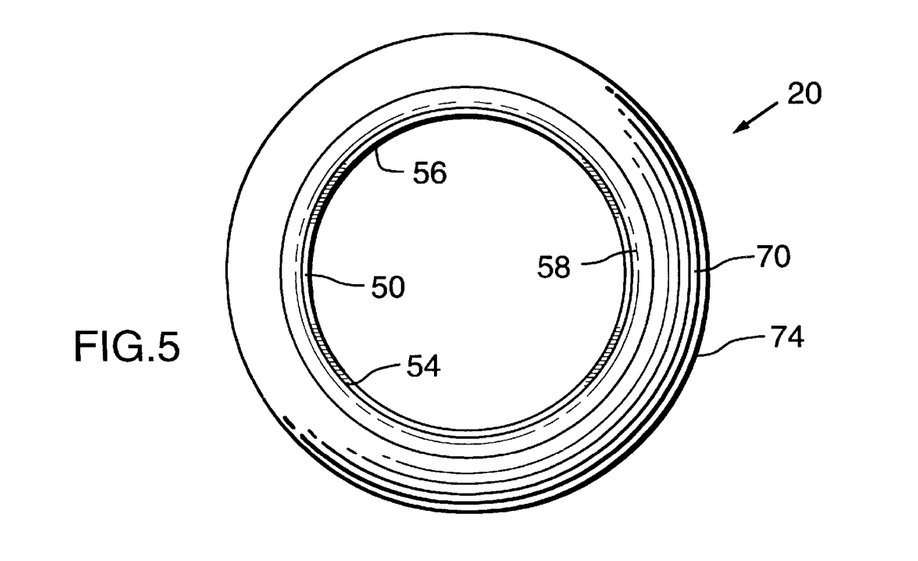
FIG. 5 is a bottom plan view of the preferred embodiment of sealing grommet shown in FIG. 2.
Figure 6:
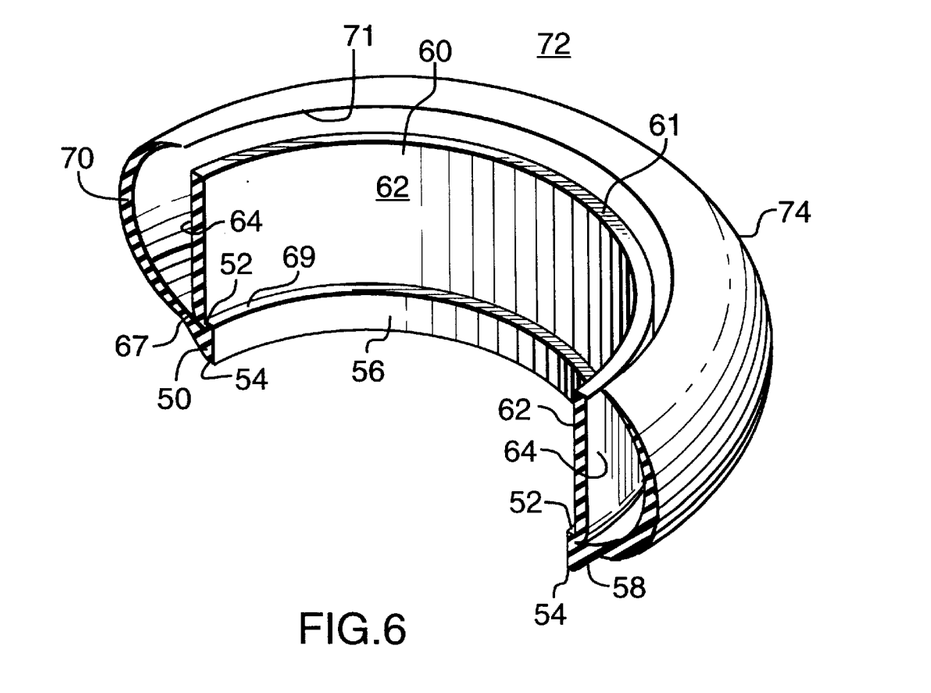
FIG. 6 is a sectional perspective view of the preferred embodiment of sealing grommet shown in FIG. 2, taken along section line 6—6 of FIG. 2.
Figure 7:
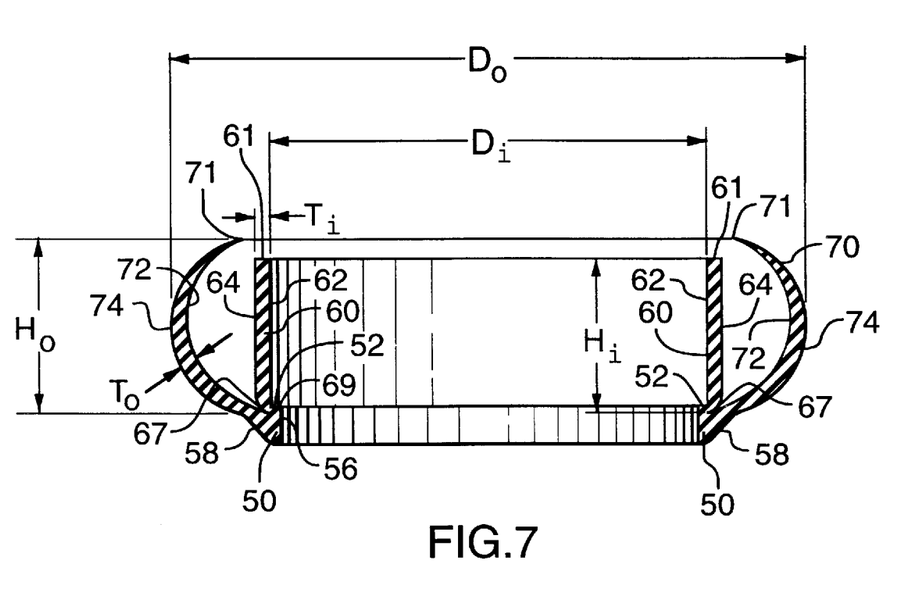
FIG. 7 is a sectional side elevational view of the preferred embodiment of sealing grommet of FIG. 2, taken along section line 6—6 of FIG. 2.

The interior wall portion 60 has an overall inside diameter "$D_i$" defined by the inner wall surface 62, as can be best seen in FIGS. 3, 5, and 7. In the preferred embodiment illustrated, the overall inside diameter "$D_i$" of the annular interior wall portion 60 is substantially less than the outside diameter 35 of the drain pipe 36, as can be best seen by comparing FIGS. 7 and 8. Further, the interior wall portion 60 is substantially resilient so as to permit stretching of the interior wall portion 60 over the bottom end portion 37 of the drain pipe 36 in order to obtain a sufficiently tight seal between the opposed inner wall surface 62 of the interior wall portion 60 of the sealing grommet 20 and the outside surface 35 of the drain pipe 36. It has been found that having the inside diameter "$D_i$" of the annular interior wall portion 60 less than the outside diameter 35 of the drain pipe 36 by about twenty percent produces a tight seal between the two opposed surfaces, yet still permits for the ready installation of the sealing grommet 20 onto the bottom end of the drain pipe 36.

Alternatively, the interior wall portion 60 may be essentially the same diameter, or a very slightly larger diameter, than the outside diameter 35 of the drain pipe 36. In this case, the interior wall portion 60 would not need to be resilient and an appropriate adhesive would be used to secure the interior wall portion 60 of the sealing grommet 20 to the outside surface 35 of the drain pipe 36.

As can best be seen in FIG. 7, the annular interior wall portion 60 has a substantially constant height "$H_i$" about its circumference. Typically, the height "$H_i$" and the thickness "$T_i$" of the annular interior wall portion 60 are related one to the other by a ratio between about 5:1 and 10:1.

The sealing grommet 20 further comprising a stop means 69 disposed on the inner wall surface 62 of the annular interior wall portion 60. The stop means 69 is for receiving the bottom end portion 37 of the drain pipe 36 in axially abutting relation thereagainst, thus ensuring proper axial registration of the sealing grommet 20 onto the drain pipe 36, as can be best seen in FIGS. 8 through 10. In the preferred embodiment illustrated, the stop means 69 comprises an annular shoulder disposed in the inner wall surface 62 of the annular interior wall portion 60 at the junction with the annular base portion 50. The stop means 69 may also take other forms and also may be disposed higher up on the inner wall surface 62 of the annular interior wall portion 60, if desired.

The annular interior wall portion 60 also preferably has a reduced annular waist portion 67 (best seen in FIG. 7) in the outer wall surface 64 at the junction with the annular base portion 50, the purpose of which reduced annular waist portion 67 will be discussed subsequently.

The sealing grommet 20 of the present invention further comprises a substantially resilient annular exterior wall portion 70 extending upwardly and outwardly from the base portion 50 in spaced apart relation to the annular interior wall portion 60. The substantially resilient annular exterior wall portion 70 terminates at a top edge 71, and is defined by opposed inner 72 and outer 74 wall surfaces. Preferably, the annular exterior wall portion 70 is concentric with the annular interior wall portion 60 and has a maximum thickness "$T_o$", as can be best seen in FIG. 7, which maximum thickness "$T_o$" is substantially constant around the circumference of the annular exterior wall portion 70. Also preferably, the annular exterior wall portion 70 has a substantially constant height "$H_o$".

In the preferred embodiment illustrated, the height "$H_o$" and the maximum thickness "$T_o$" of the annular exterior wall portion 70 are related one to the other by a ratio between about 6:1 and 12:1.

The annular exterior wall portion 70 has an overall outside diameter "$D_o$" defined by the outer wall surface 74, as can be best seen in FIGS. 3 through 5, and 7. The overall outside diameter of the annular exterior interior wall portion 60 is substantially greater than the inside diameter 82 of the leader pipe 80. The annular exterior wall portion 70 is necessarily substantially resilient to permit deformation of the exterior wall portion 70 within the top end of the leader pipe 80 in order to obtain a sufficiently tight seal between the opposed outer wall surface 74 of the annular exterior wall portion 70 of the sealing grommet 20 and the inside surface of the leader pipe 80. Further, the resiliency of the exterior wall portion 70 permits ready coupling of a drain pipe and a leader pipe that are not axially aligned one with the other.

In the preferred embodiment illustrated, and as can be best seen in FIG. 7, the substantially resilient annular exterior wall portion 70 extends upwardly and outwardly from the radially outer side surfaces of the base portion 50 in order to be in spaced apart relation to the annular interior wall portion 60. Further, to accommodate the initial slope of the annular exterior wall portion 70, the radially outer side surface of the annular base portion 50 is sloped outwardly and upwardly toward the annular exterior wall portion 70.

Also, the outer wall surface 74 of the substantially resilient annular exterior wall portion 70 is preferably convexly curved, and the inner wall surface 72 of the substantially resilient annular exterior wall portion 70 is concavely curved, thus forming a curved annular exterior wall portion 70. Further, curvature of the outer and inner 72 wall surfaces yield an annular exterior wall portion 70 that is tapered to a vertex at its top edge 71. The shape of the substantially resilient annular exterior wall portion 70, as described, helps to facilitate the insertion of the bottom end portion 37 of the drain pipe 36 with the sealing grommet 20 thereon into the top end portion 82 of the leader pipe 80, and also helps to obtain a sufficiently tight seal between the opposed outer wall surface 74 of the exterior wall portion 70 of the sealing grommet 20 and the inside surface of the leader pipe 80, or the leader pipe 40, despite their different respective inside diameters.

As can be best seen in FIGS. 7 through 10, the reduced annular waist portion 67 in the outer wall surface 64 of the annular interior wall portion 60, at the junction with the annular base portion 50, assists the deformation of the substantially resilient annular exterior wall portion 70 towards the annular interior wall portion 60, when the sealing grommet 20 is inserted into the top end of the leader pipe 80, or the leader pipe 40.

Figure 8:
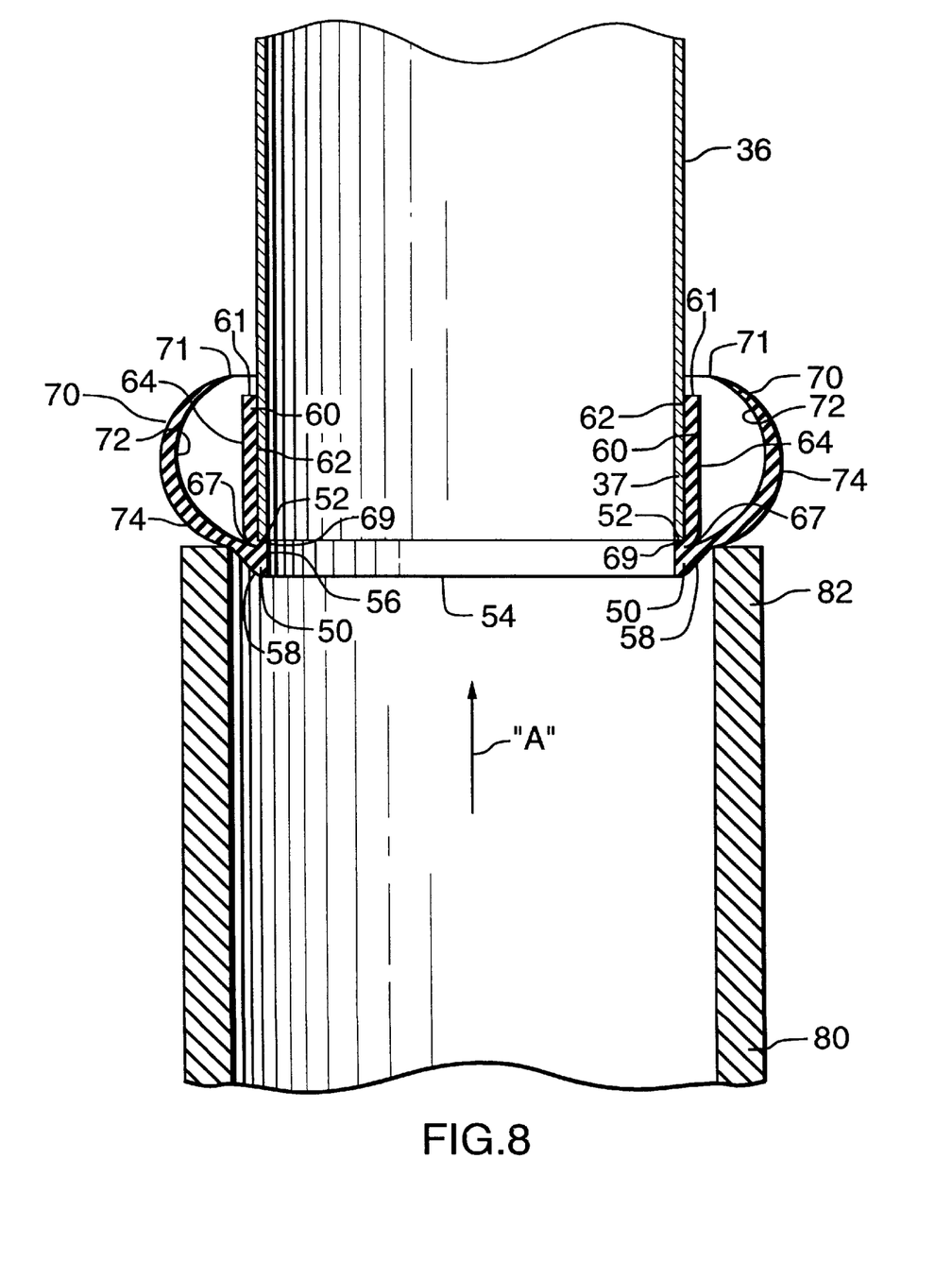
FIG. 8 is a sectional side elevational view similar to a portion of FIG. 1, on an enlarged scale, with the preferred embodiment of sealing grommet already installed on the bottom end portion of the drain pipe and about to be inserted into the top end portion of the co-operating leader pipe.

Referring now to FIGS. 8 and 9, the coupling together in sealed relation of a drain pipe 36 and a co-operating leader pipe 80 will now be described. The following explanation assumes that the roof drain 28 is in place in the roof 22 and that the drain pipe 36 is depending therefrom, as previously described. The annular interior wall portion 60 of the sealing grommet 20, which is preferably undersized by about twenty percent, is stretched radially outwardly to fit over the bottom end portion 37 of the drain pipe 36, and is forced onto the drain pipe 36 until the stop means 69 receives the bottom end portion 37 of the drain pipe 36 in axially abutting relation thereagainst. In this position, as can be best seen in FIG. 8, the bottom end portion 37 of the drain pipe 36 is retained within the substantially resilient annular interior wall portion 60 in sealed engagement with the inner wall surface 62. The leader pipe 80 is then fitted over the bottom end portion 37 of the drain pipe 36 and is pushed upwardly, as indicated by arrow "A" in FIG. 8, until the top end portion 82 of the co-operating leader pipe 80 surrounds the substantially resilient annular exterior wall portion 70 in sealed engagement with the outer wall surface 74, thereby coupling in sealed relation the drain pipe 36 and the co-operating leader pipe 80, as can be best seen in FIG. 9. As illustrated, the annular interior wall portion 60 and the annular exterior wall portion 70 together completely, or at least substantially completely, fill the gap between the outside surface 35 of the drain pipe 36 and the inside surface of the "Schedule 80" leader pipe 80.

Reference will now be made to FIG. 10, which shows the bottom end portion 37 of the drain pipe 36 retained within the substantially resilient annular interior wall portion 60 in sealed engagement with the inner wall surface 62, as described above. Also shown is the top end portion 82 of "Schedule 40" leader pipe 40 surrounding the substantially resilient annular exterior wall portion 70 in sealed engagement with the outer wall surface 74, thereby coupling in sealed relation the drain pipe 36 and the co-operating leader pipe 40. In contrast to the situation illustrated in FIG. 9, the annular interior wall portion 60 and the annular exterior wall portion 70 do not touch one another in the installed configuration illustrated so as to together completely fill the gap between the outside surface 35 of the drain pipe 36 and the inside surface 41 of the "Schedule 40" leader pipe 40, but, rather, leave a space 73 between their opposed faces. Nonetheless, the presence of the space 73 shown in FIG. 10 does not compromise the sealing integrity of the outer wall surface 74 with the inner diameter of the Schedule 40 pipe. It is therefore shown that the sealing grommet 20 of the present invention can couple in sealed relation a drain pipe depending from a roof and a co-operating leader pipe, wherein the outside diameter of the drain pipe is smaller than the inside diameter of the co-operating leader pipe by an unspecified distance.

Other variations of the above principles will be apparent to those who are knowledgeable in the field of the invention, and such variations are considered to be within the scope of the present invention. Further, other modifications and alterations may be used in the design and manufacture of the apparatus of the present invention without departing from the spirit and scope of the accompanying claims.

I claim:

1. A grommet for sealing the space between a drain pipe and a leader pipe, comprising:
    an annular base having an outer surface and an upper end, said annular base defining a first opening;
    an annular interior wall joined to said annular base at said upper end, said annual interior wall having a cylindrical inner surface defining a cylindrical opening aligned with said first opening, a cylindrical outer surface and a substantially uniform wall thickness, said annular interior wall having a reduced annular waist portion formed in said outer surface at the junction with said annular base portion; and
    an annular exterior wall extending outwardly from said base in spaced apart relation to said annular interior wall, said annular exterior wall having a convex outer surface and a concave inner surface and being dimensioned such that said convex outer surface and said concave inner surface converge to form a vertex spaced from said annular interior wall, said grommet being symmetrical about an axis through said first opening, and said cylindrical opening and being integrally molded from an elastomeric material.

2. A sealing grommet as defined in claim 1, wherein said cylindrical opening is larger than said first opening and a flat, annular surface is defined between said first opening and said cylindrical opening where said annular interior wall is joined to said annular base.

3. A sealing grommet as defined in claim 1, wherein said annular exterior wall is concentric to said annular interior wall and is joined to said annular base adjacent said annular interior wall.

4. A sealing grommet as defined in claim 1, wherein said annular interior wall is continuous and unbroken.

5. A sealing grommet as defined in claim 1, wherein said annular exterior wall is continuous and unbroken.

6. A sealing grommet as defined in claim 1, wherein said sealing grommet is made from a thermoplastic material.

7. A sealing grommet as defined in claim 1, wherein said sealing grommet is made from a vulcanized synthetic rubber material.

8. A sealing grommet as defined in claim 1, wherein said sealing grommet is made from ethylene propylene diene monomer.

9. A sealing grommet as defined in claim 1, wherein said annular exterior wall has a maximum thickness "$T_o$" and an axially-measured dimension from said vertex to where said annular exterior wall is joined to said annular base of "$H_o$," and dimension "$H_o$" is related to thickness "$T_o$" by a ratio between about 6:1 and about 12:1.

10. A sealing grommet as defined in claim 1, wherein said annular interior wall has a maximum thickness "$T_i$," and an axial length measured from where said annular interior wall is joined to said annular base of "$H_i$," and dimension "$H_i$" is related to thickness "$T_i$" by a ratio between about 5:1 and about 10:1.

11. A roof drain assembly comprised of:
    a leader pipe having an inner cylindrical surface of a first diameter defining a cylindrical opening;
    a cylindrical drain pipe defining a central drain opening, said drain pipe having an outer cylindrical surface of a second diameter that is smaller than said first diameter, an end of said drain pipe being disposed within said cylindrical opening of said leader pipe wherein an annular gap is defined between said inner cylindrical surface of said leader pipe and said outer surface of said drain pipe; and
    a molded sealing grommet formed of a resilient elastomeric material disposed in said annular gap, said grommet having:
        an annular base portion abutting said end of said drain pipe,
        an aperture through said base portion in registry with said drain opening in said drain pipe,
        a cylindrical interior wall portion extending from said annular base portion, said interior wall portion having a cylindrical inner surface engaging in sealing fashion the outer surface of said drain pipe at said end thereof, a cylindrical outer surface, a substantially uniform wall thickness and a reduced annular waist portion formed in said outer surface where said outer surface extends from said annular base; and
        an exterior wall portion extending outwardly from said annular base and surrounding said interior wall in spaced apart relation, said exterior wall portion sealingly engaging the inner cylindrical surface of said leader pipe.

12. An assembly as defined in claim 11, wherein said grommet is molded to have a neutral, unflexed configuration wherein said annular exterior wall has a convex outer surface and a concave inner surface, and said annular exterior wall is dimensioned such that said convex outer surface and said concave inner surface converge to form a vertex spaced from said annular interior wall.

13. An assembly as defined in claim 12, wherein when said grommet is in said neutral, unflexed configuration, said convex outer surface has an outer diameter greater than the first diameter of said inner cylindrical surface of said leader pipe.

14. An assembly as defined in claim 13, wherein said exterior wall is concentric to said interior wall and is joined to said annular base adjacent said interior wall.

15. An assembly as defined in claim 13, wherein said interior wall is continuous and unbroken.

16. An assembly as defined in claim 13, wherein said exterior wall is continuous and unbroken.

17. An assembly as defined in claim 13, wherein said sealing grommet is made from a thermoplastic material.

18. An assembly as defined in claim 13, wherein said sealing grommet is made from a vulcanized synthetic rubber material.

19. An assembly as defined in claim 13, wherein said sealing grommet is made from ethylene propylene diene monomer.

\* \* \* \* \*

UNITED STATES PATENT AND TRADEMARK OFFICE
CERTIFICATE OF CORRECTION

PATENT NO.     : 6,168,208 B1
DATED          : January 2, 2001
INVENTOR(S)    : Ken Thaler It is certified that error appears in the above-identified patent and that said Letters Patent is hereby corrected as shown below:

<u>Column 8,</u>
Line 5, delete "scaling" and insert therefor -- sealing --.

Signed and Sealed this

Twenty-second Day of October, 2002

Attest:

JAMES E. ROGAN
Attesting Officer          Director of the United States Patent and Trademark Office